US012536410B2

(12) United States Patent
Kim et al.

(10) Patent No.: US 12,536,410 B2
(45) Date of Patent: Jan. 27, 2026

(54) DEVICE AND METHOD FOR EXTRACTING DIALOGUE-BASED RELATION EXTRACTION BASED ON UTTERANCE-LEVEL COMPUTATION OVER GRAPH STRUCTURE

(71) Applicant: KOREA UNIVERSITY RESEARCH AND BUSINESS FOUNDATION, Seoul (KR)

(72) Inventors: Jinsung Kim, Seoul (KR); Heuiseok Lim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 216 days.

(21) Appl. No.: 18/405,051

(22) Filed: Jan. 5, 2024

(65) Prior Publication Data
US 2024/0249120 A1    Jul. 25, 2024

(30) Foreign Application Priority Data
Dec. 19, 2022 (KR) .......................... 10-2022-0178390

(51) Int. Cl.
*G06N 3/02* (2006.01)
*G06N 3/0464* (2023.01)

(52) U.S. Cl.
CPC ................. *G06N 3/0464* (2023.01)

(58) Field of Classification Search
CPC .................................................... G06N 3/0464
See application file for complete search history.

(56) References Cited

U.S. PATENT DOCUMENTS

2020/0004878 A1\*   1/2020   Beaumont ............. G06F 16/685
2020/0193094 A1\*   6/2020   Topol ...................... G06F 40/30

FOREIGN PATENT DOCUMENTS

| KR | 10-2020-0066972 A | 6/2020 |
| KR | 10-2191133 B1 | 12/2020 |
| KR | 10-2022-0083414 A | 6/2022 |
| KR | 10-2405578 B1 | 6/2022 |

\* cited by examiner

*Primary Examiner* — Ibrahim Siddo
(74) *Attorney, Agent, or Firm* — Hauptman Ham, LLP

(57) ABSTRACT

Disclosed is a device and method for dialogue relation extraction using utterance-level graph computation. The dialogue relation extraction method refers to a dialogue relation extraction method performed by a computing device including at least a processor and includes receiving a target conversation that includes a plurality of utterances and an argument pair that is a target of relation extraction; generating a graph (G=(A, X)) that includes an adjacency matrix (A) and a node feature matrix (X) based on the target conversation and the argument pair; and deriving a relation between subject and object included in the argument pair by inputting the graph to a graph convolutional network (GCN) trained to infer the relation of the argument pair.

4 Claims, 2 Drawing Sheets

DEVICE AND METHOD FOR EXTRACTING DIALOGUE-BASED RELATION EXTRACTION BASED ON UTTERANCE-LEVEL COMPUTATION OVER GRAPH STRUCTURE

CROSS-REFERENCE TO RELATED APPLICATION

The present application claims the benefit of priority to Korean Patent Application No. 10-2022-0178390 filed on Dec. 19, 2022 in the Korean Intellectual Property Office. The aforementioned application is hereby incorporated by reference in its entirety.

TECHNICAL FIELD

The present invention relates to a conversation-based relation extraction system, and more particularly, to extracting a relation in conversation through graph computation.

RELATED ART

This system uses a graph convolutional network (GCN) as an artificial neural network model for dialogue relation extraction. The graph convolutional network refers to an extended type of machine learning algorithm that converts a node included in a graph or the graph itself to data in a vector form by employing convolution, which is mainly used in image data processing for graph data. Also, a prompt-based learning methodology using a blank inference technique of a language model is used to express an advisor node that plays an important role in the present invention, which is a technology that actively utilizes inherent knowledge of the language model by reducing discrepancy in learning technique between fine-tuning and pre-training of the language model. In the related art, in implementing a relation extraction system in a natural language processing field, sentence-level or single document-level data is mostly targeted and thus, it is difficult to find inventive technology for processing conversation data having characteristics of multiple speakers and multiple utterances and written in colloquial language that is difficult to process, through a specialized effective methodology.

Also, when receiving, as an input, conversation data that includes multiple speakers and multiple utterances and is written in colloquial language difficult to process, and it is difficult for a language model to determine which part of the input is to be focused on solving a task due to characteristics, such as cross-reference and length of the input. Therefore, there is a need to propose a technique that effectively deals with this.

DESCRIPTION OF INVENTION

A technical subject to be achieved by the present invention is to provide a device and method for dialogue relation extraction using an utterance-level graph computation.

Solution

A dialogue relation extraction method, according to an example embodiment of the present invention, refers to a dialogue relation extraction method performed by a computing device, including at least a processor, and includes receiving a conversation that includes a plurality of utterances and an argument pair that is a target of relation extraction; generating a graph ($G=(A, X)$) that includes an adjacency matrix ($A$) and a node feature matrix ($X$) based on the conversation and the argument pair; and deriving a relation between subject and object included in the argument pair by inputting the graph to a graph convolutional network (GCN) trained to infer the relation of the argument pair.

Effect

The present invention provides performance improvement in relation extraction, which is one of the most representative tasks in an information extraction field using a pre-trained language model. Also, it provides indicators for an architecture suitable for dialogue relation extraction data through a node that acts as an advisor through graph neural network technology and prompt-based learning methodology for conversation data.

In particular, by utilizing a graph convolutional network algorithm using a convolution technique with good performance in image processing among graph neural network techniques, it is possible to more hierarchically verify the inherent correlation and interaction among an utterance node, an argument node, and an advisor node. Also, it is possible to directly utilize inherent knowledge of a pre-trained language model trained with large data by expressing the embedding of the advisor node through a prompt-based learning methodology.

MODE

Figure 1:
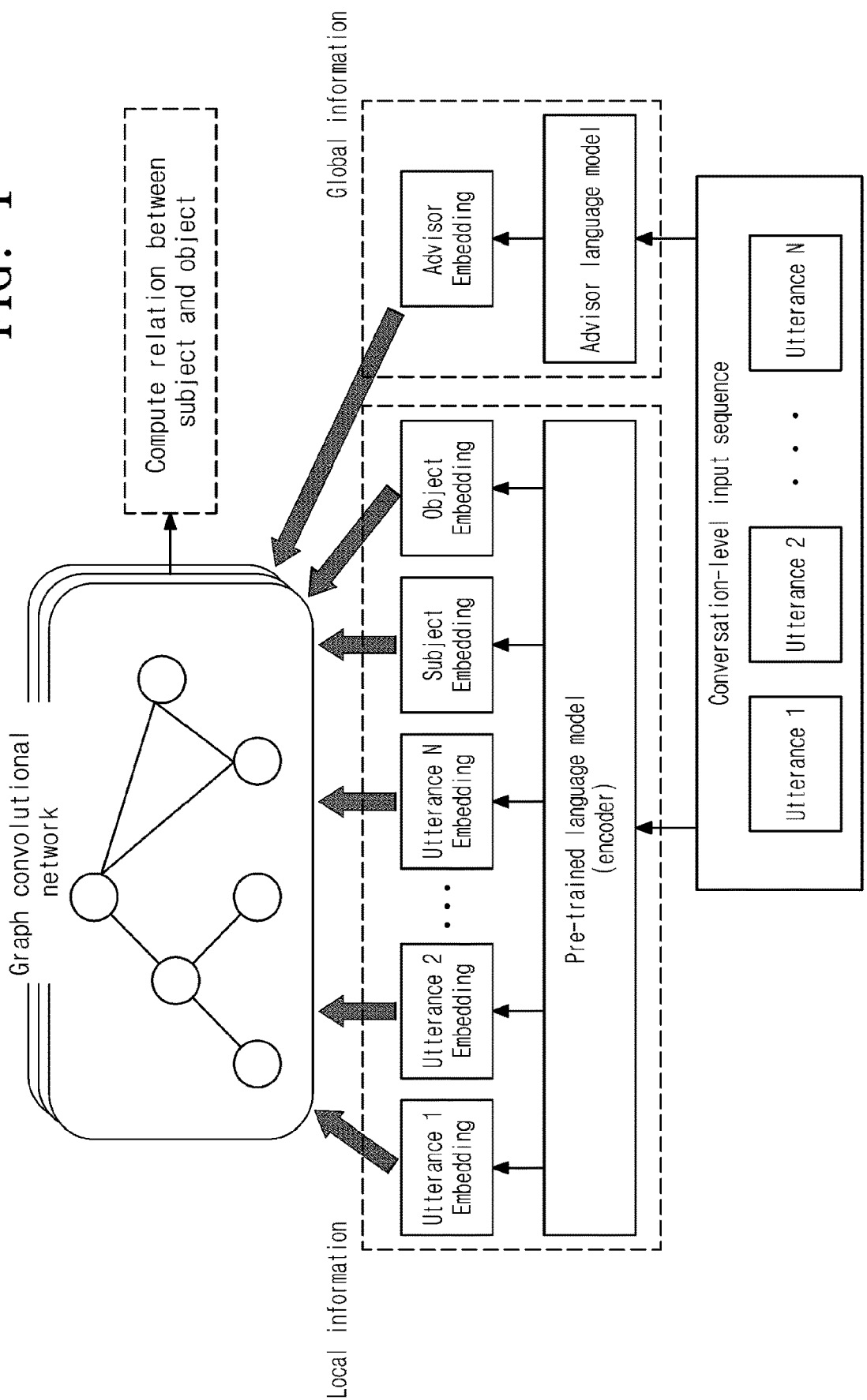
FIG. 1 is a conceptual diagram illustrating a relation extraction method according to an example embodiment of the present invention.

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). A similar interpretation should apply to such relational terms as "between," "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described;

others may exist, be added or modified. Existence and addition as to one or more features, numbers, steps, etc., should not be precluded.

Unless otherwise clearly stated, all of the terms used herein, including scientific or technical terms, have meanings that are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

Hereinafter, example embodiments will be described with reference to the accompanying drawings. However, the scope of the patent application is not limited to or restricted by such example embodiments. Like reference numerals used herein refer to like elements throughout.

The present invention relates to a device and method for dialogue relation extraction using utterance-level graph computation. Graph convolutional network (GCN) technology used in the present invention for graph computation of a graph structure including an utterance unit node, an argument node (subject node and object node), and an advisor node extracted from conversation data considers only feature information of nodes. Therefore, as an input to a model, graph G=(A, X) that includes an adjacency matrix A representing connection between the respective nodes (existence of trunk) and a node feature matrix X is defined. An equation that receives such graph data and configures a new latent node feature matrix H through convolution is represented as Equation 1. In Equation 1, W denotes a learnable weight matrix.

$$H = \psi(A, X) = \sigma(AXW) \qquad \text{[Equation 1]}$$

In a graph convolutional network, output H(k) of a kth graph convolution layer among graph convolution layers that convert data in a graph form to data in a vector form is defined as Equation 2. In Equation 2, D denotes a degree matrix of the adjacency matrix A.

$$H^{(k)} = \sigma\left(\tilde{D}^{-1/2} \tilde{A} \tilde{D}^{-1/2} H^{(k-1)} W^{(k)}\right) \qquad \text{[Equation 2]}$$

Through application of the graph convolutional network as above, interaction and inherent dependency between an utterance node and an argument (subject, object) node extracted from long conversation text are effectively captured and reflected in embedding expression.

FIG. 1 is a conceptual diagram illustrating a relation extraction method according to an example embodiment of the present invention.

Referring to FIG. 1, a conversation including a plurality of utterances is given. For example, the conversation may include a total of N (N denotes any natural number) utterances. Here, each utterance may be one by the same speaker or may be one by a different speaker. A plurality of speakers may participate in the conversation.

An input to a relation extraction model proposed herein is given as a conversation-level input sequence. That is, the conversation-level input sequency may be a conversation that includes utterances by a plurality of speakers. Also, a relation extraction method proposed herein may largely include two operations, 1) graph generation operation and 2) relation extraction operation.

In graph generation operation, the relation extraction model generates a graph from the input. Graph G may include a node feature matrix X that includes feature (or property) for each of nodes and an adjacency matrix A that includes information on presence or absence of trunk between the respective nodes.

In detail, embedding of each utterance may be generated in such a manner that the conversation constituting the input is divided based on an utterance unit and each utterance is encoded through input to a pre-trained language model (PLM). Additionally, the input may include an argument pair, that is, subject and object and the argument pair may also be input to the PLM and embedding for the argument pair, that is, embedding for the subject and embedding for the object may be generated. The embedding for each utterance and the embedding for the argument pair constitute the node feature matrix X. An exemplary PLM may be fine-tuned RoBERTa, but the scope of the present invention is not limited thereto and the PLM may be variously modified depending on example embodiments. Through this, a relation may be extracted by considering local information on long conversation text.

An advisor node may be generated to consider global information on the given conversation text. The advisor node may be generated by inputting the entire conversation to a model (e.g., pretrained language model) and extracting embedding without dividing the given conversation. For example, the advisor node may be generated by applying a soft prompt technique to the pretrained language model (e.g., RoBERTa).

As described above, the node feature matrix X that includes embedding of each utterance, embedding of the argument pair, and embedding of the advisor node as features may be generated. The adjacency matrix represents presence or absence of trunk between the respective nodes (or the respective embeddings) and the trunk may be regarded to be present between nodes (or utterances) including a common entity (arbitrary entity, predetermined entity, and/or argument pair). Also, the advisor node may be regarded to have a trunk with a node corresponding to the subject of the argument pair and a node corresponding to the object of the argument pair.

In relation extraction operation, a relation for the argument pair may be extracted by inputting the generated graph G to the graph convolutional network (GCN). Here, the GCN may represent a model pre-trained to extract (infer) the relation of the argument pair for the given input.

Figure 2:
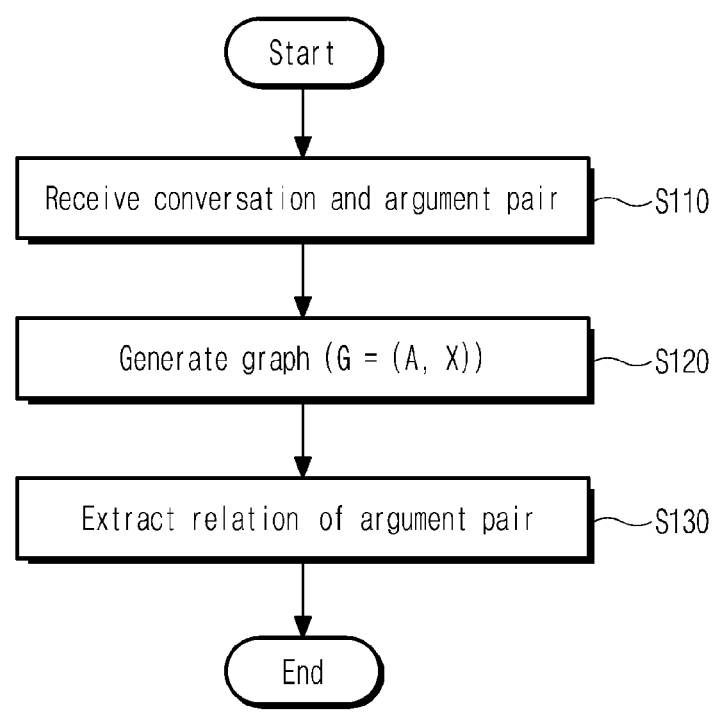
FIG. 2 is a flowchart illustrating a relation extraction method according to an example embodiment of the present invention.

FIG. 2 is a flowchart illustrating a relation extraction method according to an example embodiment of the present invention.

The relation extraction method of FIG. 2 may be performed by a computing device that includes a processor and/or a memory. That is, at least some of operations that constitute the relation extraction method may be understood as an operation of the processor included in the computing device. The computing device may include, for example, a personal computer (PC), a server, a tablet PC, a laptop computer, a notebook, a smartphone, smart glasses, a smart watch, a head mounted device (HMD), and the like.

In operation S110, conversation and an argument pair (subject and object) are received. The conversation includes a plurality of utterances by a plurality of speakers. The argument pair may represent a target of relation extraction. To this end, the computing device may receive the conversation and the argument pair through a wired/wireless communication network or may receive the conversation or the argument pair from a user or an external storage device through an input/output (I/O) interface. Depending on example embodiments, the conversation and the argument pair may be prestored in a storage device (also, referable to as storage) included in the computing device.

In operation S120, a graph G=(A, X) is generated based on the received conversation and argument pair.

Nodes that constitute the graph may include a node corresponding to each utterance included in the conversation, a node corresponding to the subject of the argument pair, a node corresponding to the object of the argument pair, and a node corresponding to the entire conversation.

The adjacency matrix A that constitutes the graph may be generated from presence or absence of a common entity included in each utterance. Also, an advisor node may be considered to have a trunk with a subject node and an object node. The node feature matrix X that constitutes the graph may represent embedding of each of utterances constituting the conversation, embedding of the subject, embedding of the object, and embedding of the entire conversation. A pre-trained language model may be used to form the embedding.

In operation S130, a relation of the argument pair (subject and object) may be inferred by inputting the generated graph to a GCN. Here, the GCN may be a model pre-trained using learning data that includes input data (graph) and the relation (label) of the argument pair.

The aforementioned method according to example embodiments may be implemented in a form of a program executable by a computer apparatus. Here, the program may include, alone or in combination, a program instruction, a data file, and a data structure. The program may be specially designed to implement the aforementioned method or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method are described, the apparatus and method are not limited to the aforementioned example embodiments. Various apparatuses or methods implementable in such a manner that one of ordinary skill in the art makes modifications and alterations based on the aforementioned example embodiments may be an example of the aforementioned apparatus and method. For example, although the aforementioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A dialogue relation extraction method performed by a computing device comprising at least a processor, the dialogue relation extraction method comprising:
   receiving a target conversation that includes a plurality of utterances and an argument pair that is a target of relation extraction;
   generating a graph (G=(A, X)) that includes an adjacency matrix (A) and a node feature matrix (X) based on the target conversation and the argument pair; and
   deriving a relation between subject and object included in the argument pair by inputting the graph to a graph convolutional network (GCN) trained to infer the relation of the argument pair.

2. The dialogue relation extraction method of claim 1, wherein the generating of the graph comprises:
   generating the node feature matrix by generating embedding corresponding to each utterance in the conversation, embedding corresponding to the subject, embedding corresponding to the object, and embedding corresponding to the conversation; and
   generating the adjacency matrix that includes information on presence of trunk between nodes based on presence and absence of a common entity.

3. The dialogue relation extraction method of claim 2, wherein the generating of the adjacency matrix comprises generating the adjacency matrix by regarding an advisor node that is a node corresponding to the embedding corresponding to the conversation to have the trunk with the node corresponding to the subject and the node corresponding to the object.

4. The dialogue relation extraction method of claim 2, wherein the generating of the node feature matrix comprises generating the embedding using a pretrained language model (PLM).

* * * * *